United States Patent [19]

Neff

[11] Patent Number: 5,009,189
[45] Date of Patent: Apr. 23, 1991

[54] AQUATIC CAGE AND METHOD

[76] Inventor: Gregor N. Neff, 85 Myrtle Ave., Dobbs Ferry, N.Y. 10522

[21] Appl. No.: 543,674

[22] Filed: Jun. 25, 1990

[51] Int. Cl.$^5$ ............................................. A01K 61/00
[52] U.S. Cl. .......................................... 119/3; 119/17; 383/119; 220/9.2
[58] Field of Search .................... 119/4, 3, 15, 17, 19; 383/119; 220/485, 489, 9.1, 9.2, 9.3

[56] References Cited

U.S. PATENT DOCUMENTS

| 636,381 | 11/1899 | Hamel | 220/9.1 |
| 904,142 | 11/1908 | Moore | 220/9.1 |
| 1,192,091 | 7/1916 | Miller | 220/9.1 |
| 2,749,956 | 6/1956 | Eldred | 220/9.3 |
| 4,079,698 | 3/1978 | Neff et al. | 119/3 |
| 4,429,659 | 2/1984 | Holyoak | 119/3 |

FOREIGN PATENT DOCUMENTS

| 2404395 | 6/1979 | France | 119/4 |
| 2467545 | 5/1981 | France | 119/4 |
| 1111714 | 9/1984 | U.S.S.R. | 119/3 |

Primary Examiner—John G. Weiss
Attorney, Agent, or Firm—Curtis, Morris & Safford

[57] ABSTRACT

The cage has a vertical side wall made of flexible netting. Vertically elongated receptacles are attached to the side walls at spaced intervals, and stiff support rods are inserted into the receptacles to stiffen the sidewall and cause it to stand erect when the cage rests on the ground or the bottom of the body of water. When the stiffeners are removed from the receptacles, the flexible netting and the receptacles bend easily so that the sidewalls can be folded up to flatten the cage and greatly reduce its volume to facilitate transporting, storing, or handling the cage. Preferably, the cage has a simple steel rebar rod frame with an extruded plastic channel around the rebar and holding the edges of netting material forming the top and the sidewall of the cage. Similar channels are used to form the bottom border of the cage. The top of the cage is a flexible flap of the netting material bordered with the channel material and reinforced with rebar rods. The bottom border also is reinforced with rebar rods.

13 Claims, 2 Drawing Sheets

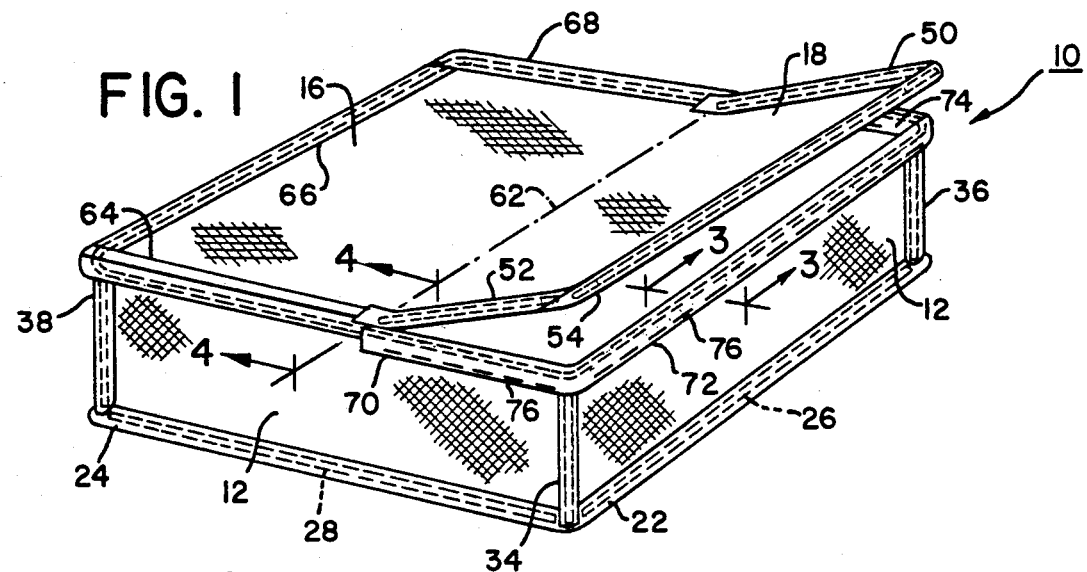
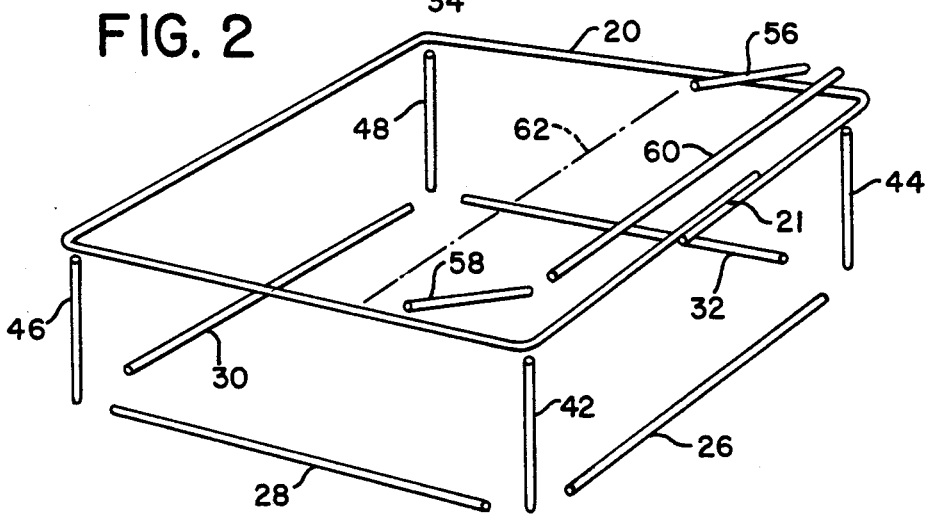
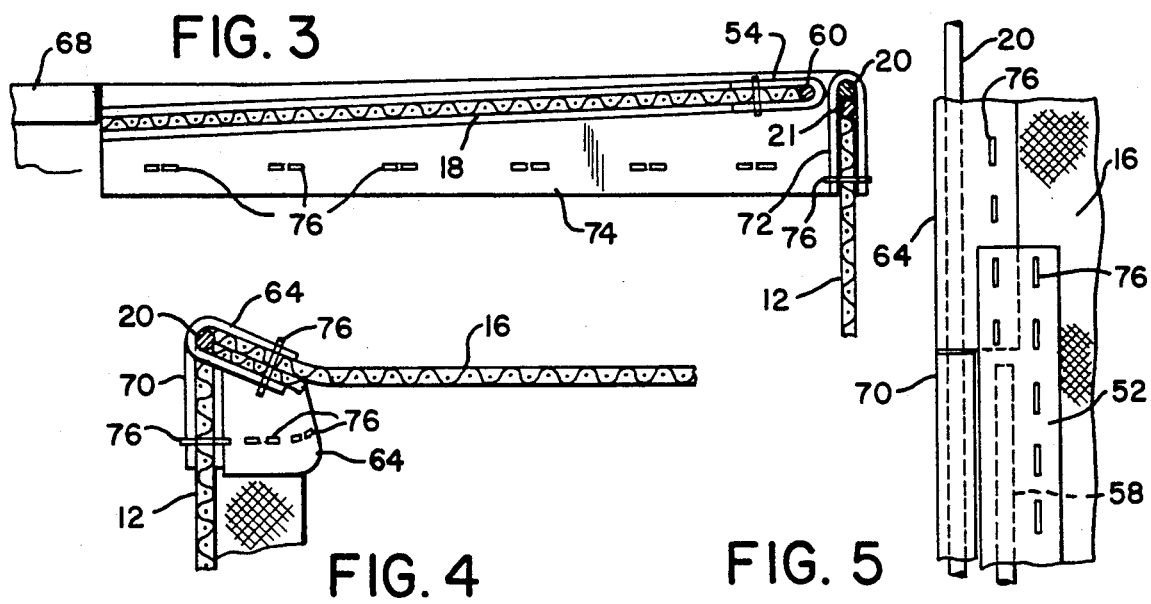

AQUATIC CAGE AND METHOD

This invention relates to aquatic animal cages for holding and growing fish, crustaceans and other aquatic life, and to methods of transporting, storing, handling and setting up such cages for use.

It is preferred that some cages rest on the bottom of a body of water in which they are immersed. For example, some clam-growing cages rest on the bottom of shallow intertidal waters. Water flows through the cage during rising and falling tides from which clams housed in the cage can feed and grow. Such cages should be able to stand upright on the bottom so that they do not collapse when they are out of the water.

Similarly, it sometimes desirable to have floating fish cages with relatively stiff vertical sidewalls.

One of the problems with cages with stiff vertical sidewalls is that they are extremely bulky. This makes transportation, handling or storage difficult and expensive.

Prior art cages with flexible sidewalls which fold easily and allow the cage be flattened for transportation, storage and handling are well-known. Such cages are shown, for example, in U.S. Pat. Nos. 4,003,338, and 4,079,698, and in U.S. patent application Ser. No. 135,781, filed Dec. 21, 1987. However, such cages will not stand up when sitting on the ground or on the bottom of a body of water.

Another problem is that it is desired to build a strong and rugged cage, but at a relatively low cost.

Accordingly, it is one of the objects of the present invention to provide a cage with a flexible sidewall or walls which easily can be folded up and flattened to facilitate transportation, handling, storage, etc., but which can be converted to have stiff sidewalls which will hold the cage erect when the cage is sitting on solid ground, or is floating in the water.

Furthermore, it is an object to provide a cage which is of simple, low-cost but strong construction; a cage which will last for a long time in use.

The foregoing objects are met, in accordance with the present invention, by the provision of a cage and method of transporting, handling and/or storing it, in which upwardly-extending receptacles are provided at spaced intervals around the sidewall of the cage. The receptacles are flexible themselves, but are adapted to receive stiffener members such as steel rebar rods which, when inserted in the receptacles, will cause the cage to stand up when resting on the bottom of a body of water, or on dry land.

When the stiffeners are removed from the receptacles, the flexible sidewall and receptacles easily can be folded up and flattened so as to greatly reduce the volume of the cage and facilitate transportation, storage and handling of the cage. This greatly reduces the cost of shipment from the factory to the customer, and greatly reduces the volume of the cage for storing it when it is not in use. Similarly, the folded cage is considerably easier to handle.

Further in accordance with the invention, a cage is provided with a simple frame made of relatively thin but strong rod, with netting sidewalls which are inserted together with the frame rod into a plastic channel which then is fastened to the netting and around the rod. This forms a simple but strong border holding all of the netting panels together with the frame, without bolts, nuts, or other threaded fasteners.

Preferably, the frame is made out of ordinary reinforcing steel rod or "rebar", and the channel member is an extruded polyethylene plastic member. Preferably, stainless steel staples are driven through the sidewalls of the border and the netting to hold the parts together. A simple flap is provided in the top of the cage to open and shut the cage. The flap preferably is bordered with the plastic channel material mentioned above, preferably, and reinforced with steel rebar inserted into the hollow interior of the border.

Other features and advantages of the invention will be set forth from the description of the drawings which follow:

IN THE DRAWINGS

FIG. 1 is a perspective view of a cage constructed in accordance with the present invention;

FIG. 2 is a schematic diagram of reinforcing steel rod frame members which are used in the cage shown in FIG. 1;

FIG. 3 is a cross-sectional view taken along line 3—3 of FIG. 1;

FIG. 4 is a cross-sectional view taken along line 4—4 out of FIG. 1;

FIG. 5 is a fragmentary top plan view of portion of the cage shown in FIG. 1;

GENERAL DESCRIPTION

Figure 6:
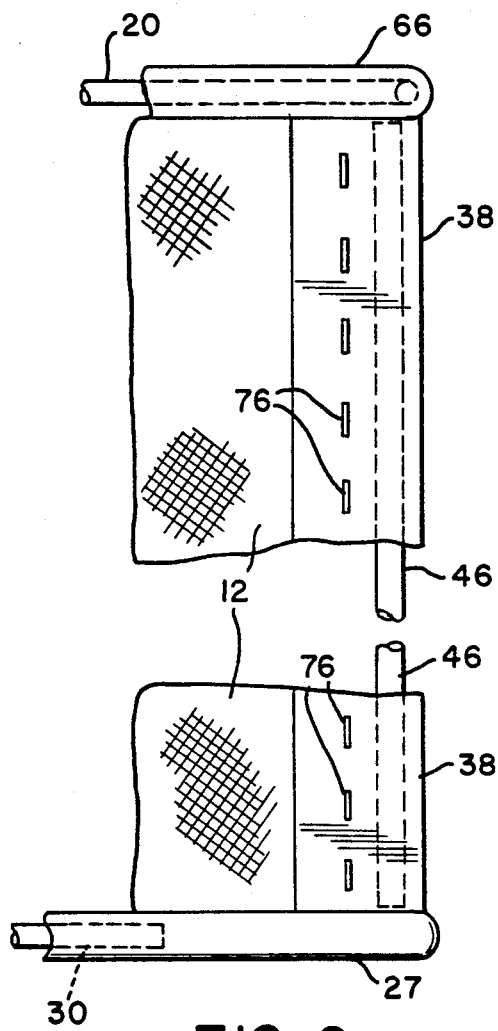
FIG. 6 is a fragmentary elevation view of one of the rear corners of the cage shown in FIG. 1.

The cage shown in FIG. 1 includes a single sidewall made of netting, such as extruded polyethylene netting which is commonly used in aquaculture. The cage also includes a bottom netting panel 14 (FIG. 8) and a top netting panel 16 with an integral door or lid formed by a flap 18 made out of the netting material of the top 16.

At each of the four corners of the cage there is a flexible tubular receptacle 34, 36, 38 or 40 (See FIG. 8) into which is inserted on stiffener member in the form of a steel rebar rod 42, 44, 46 or 48. This structure stiffens the side wall and causes the cage to sit upright on the ground or on the bottom of a body of water.

When the stiffener rods are removed, the cage sidewall and receptacles easily can be folded to flatten the cage for ease of transport, handling, and storage.

FRAME CONSTRUCTION

Referring now to FIG. 2, the cage 10 has a top frame 20 made out of bent steel reinforcing rod or "rebar". The ends of the rebar are welded together at 21. Preferably, the bar ends are superimposed, one on top of the other, in order to fit into the vertical border which surrounds the frame at the front of the cage.

An extruded polyethylene plastic channel material is used as border material for all borders of the cage. As it is shown particularly in FIGS. 3 and 4, the channel members such as 64, 70, 54 and 72 embrace the cut edges of the adjoining netting panels, as well as the rebar reinforcement or frame. Staples 76 are driven through the sidewalls of the channels and the netting so as to firmly hold them together with frame 20.

Figure 8:
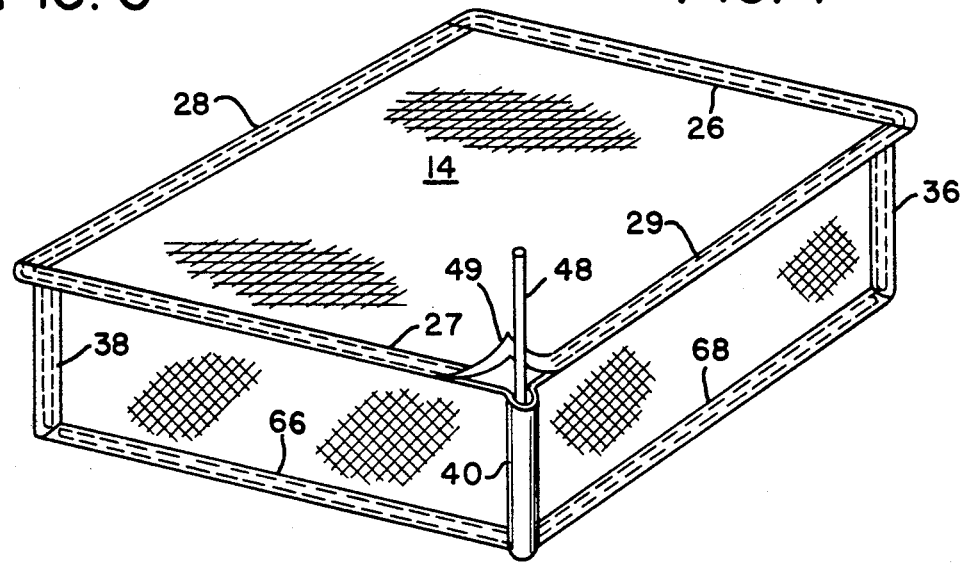
FIG. 8 is a perspective view showing the cage of FIG. 1 turned upside-down to insert or remove stiffeners from the receptacles on the sidewall.

Referring again to FIG. 2, there are four bottom border channel members 22, 24, 27 and 29 (see FIG. 8 for the last two items). Inside each of the bottom border members is a piece of rebar 26, 28, 30 or 32, respectively. Each of the pieces of rebar is shorter than the channel member in which it is inserted. Typically, the rebar does not fill the last few inches at each end of the channel. This leaves the corners of the bottom border flexible, while the rebar pieces serve to help hold the bottom taut and form a smooth bottom wall.

The flap 18 used for a lid also has the channel material as a border. That border includes short sections 50 and 52 on the sides, and along section 54 on the front. Channel 50 has a short reinforcing bar section 56, and similar reinforcing bars 58 and 60 are inserted in the channels 52 and 54. Thus, the closure flap 18 can flex about a hinge 62 made merely of the same netting material forming the rest of the top of the cage.

The lid 18 can be closed, as is shown in FIG. 3. It can be locked by simply wiring it shut, or by the use of one of the variety of releasable clasps or fasteners known for such a purpose. However, for growing slow-growing animals such as mollusks, access to the cage is needed only infrequently, and the closure for the lid can simply be one or two pieces of stainless steel wire wrapped around the border of the lid 18 and the top frame.

Referring again to FIG. 1, the top border of the cage consists of rear sections 64, 66 and 68, which are nearly horizontal, and front sections 70, 72 and 74, which are substantially vertical. The structure of the border section is shown in detail in FIGS. 3 and 4.

FIG. 5 shows details of the attachment of the 10 channel section 52 to channel section 64 and the netting of the top in order to form a strong, reinforced hinge for the lid 18.

STIFFENER RECEPTACLES

Each of the four vertical receptacles at the corners of the cage is a plastic channel member like the border members.

The ends of the single netting panel which forms the sidewall 12 of the cage are inserted into one of the channel receptacles at the corners and stapled to fasten the ends together and seal the enclosure.

Figure 7:
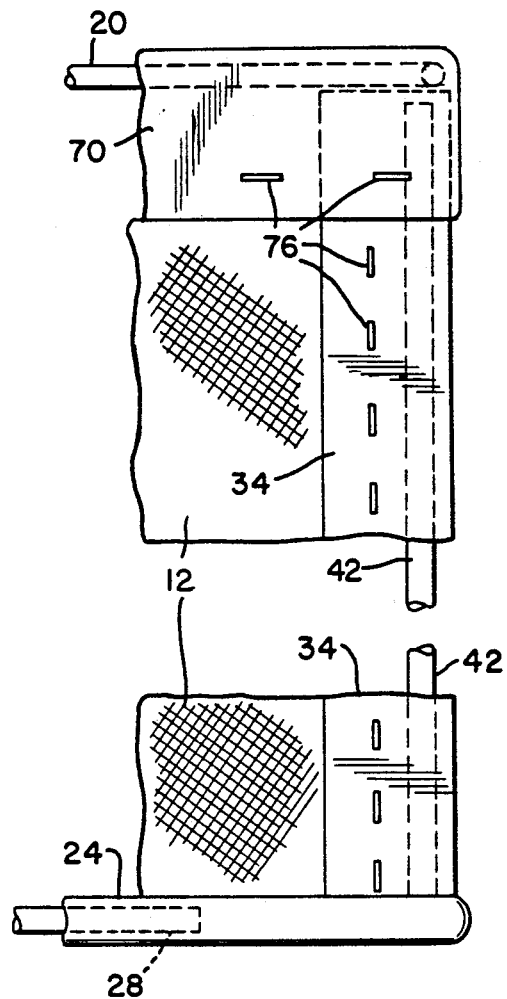
FIG. 7 is a fragmentary elevation view of one of the front covers of the cage shown in FIG. 1.

FIG. 6 shows an enlarged detailed elevation view of the channel member or receptacle 38 at one of the rear corners of the cage, and FIG. 7 shows a channel member or receptacle 34 at one of the front corners of the cage.

The corner shown in FIG. 6 is formed by inserting the netting material of the sidewall at the corner into the channel which already contains the piece of rebar 46, and then stapling the opposing sidewalls of the panel together, with the staples 76 passing through the netting material.

The lower end of the channel 38 and the rebar 46 abut advantageously against the corner of the bottom border of the cage. This provides a bottom support for the rod and the channel to prevent them from being embedded in the earth or bottom of the body of water in which the cage is sitting.

The top of the rebar stiffener rod 46 also abuts against the corner of the upper border of the cage, as is shown in FIG. 6.

The structure of the corner shown in FIG. 7 is essentially the same as that shown in FIG. 6, except that at the top of the corner the sidewalls of the channel 34 are inserted into the channel sections 70 and 72, and the stiffener rod 42 extends up into the corner formed between channels sections 70 and 72.

TRANSPORTATION, HANDLING AND STORAGE

When it is desired to transport or handle or store the cage, it can be collapsed and flattened by the simple expedient illustrated in FIG. 8, which shows the cage 10 turned upside down, with the receptacle 40 facing forwardly. The corner 49 of the bottom border is grasped and folded away from the bottom of the vertical receptacle 40, and the rebar section 48 is pulled upwardly and outwardly. The same is done for each of the other three corners of the cage. Then, the sidewalls and receptacles are folded, and the cage is collapsed to a relatively small thickness. This reduces the volume for shipping, for storage, and for handling.

When it is desired to set the cage up again, the process described above is reversed. The cage is turned upside down as shown in FIG. 8, and the steel rebar rod 48 is inserted into receptacle 40 after bending the border corner 49 up. The same is then done for each of the other corners of the cage, and it is ready once again for use. Since the rod should fit into the receptacles fairly snugly, it may have to be tapped with a hammer or the like to insert it.

The cage described above amply fulfills the objectives set forth above.

The cage easily can be converted from a self-supporting, erect cage with a stiff side wall to one with an easily flexible sidewall which can be folded up to facilitate and reduce the cost of shipping, handling and storage of the cage.

The cage is relatively simple and inexpensive to make. The structure uses a plastic extrusion, rebar and stapling in place of other more time-consuming and expensive assembly techniques and materials. Moreover, the materials used are durable and relatively easy to work with.

The above-description of the invention is intended to be illustrative and not limiting. Various changes or modifications in the embodiments described may occur to those skilled in the art and these can be made without departing from the spirit or scope of the invention.

I claim:

1. An aquatic animal cage, said cage comprising, in combination, an upwardly-extending side-wall made of a flexible netting material, a bottom-wall connected to said side-wall and forming, in combination with said side-wall, an aquatic animal enclosure, a plurality of upwardly-extending receptacle means secured to said side-wall and spaced apart from one another, each of said receptacle means being elongated and constructed to receive an elongated upwardlyextending support member which is stiff relative to said netting material of said side wall, and is adapted, when said receptacles contain such support members, to support said side wall above the ground when said bottom-wall is on the ground, and to allow said side-wall to fold and collapse when said support members are removed.

2. A cage as in claim 1, including a frame, said side-wall being secured to said frame adjacent the upper edge of said side wall, said receptacle means being positioned to place said support members in supporting relationship to said frame to support said frame above the ground when said bottom wall is on the ground.

3. A cage as in claim I, in which said receptacle means comprises a flexible, generally tubular conduit with at least one open end.

4. A cage as in claim 2, including an openable upper wall for said cage, said upper wall being attached to said frame.

5. A cage as in claim in which said side-wall comprises a plurality of substantially planar panels forming angular corners at the junctions of said panels, each of said receptacle means comprising a plastic tube with an open, reentrant shape at each of said corners embracing the material of said side-wall at said corner and fastened thereto.

6. An aquatic animal cage, said cage comprising, in combination, an upwardlyextending side-wall made of a flexible netting material, a bottom-wall connected to said side-wall and forming, in combination with said side-wall, an aquatic animal enclosure, a plurality of upwardly-extending receptacle means secured to said side-wall and spaced apart from one another, each of said receptacle means being elongated and constructed to receive an elongated upwardly-extending support member which is stiff relative to said netting material of said side wall, and is adapted, when said receptacles contain such support members, to support said side-wall above the ground when said bottom-wall is on the ground, and to allow said side-wall to fold and collapse when said support members are removed, including a border member joining said side wall to bottom wall, each of said receptacle means abutting said border member at its lower end.

7. A cage as in claim 6 in which said border member is flexible in the vicinity of the lower end of each of said receptacle means so that it can be bent away from said lower end to allow insertion of said support member into or removal of said support means from said receptacle means.

8. A cage as in claim 7, in which said border member contains a stiffener member wherein, except in each such vicinity.

9. A cage for aquatic animals, said cage comprising, in combination, a frame made of relatively strong, slender, elongated rod-shaped material, a netting side-wall, a netting bottom-wall, a netting top-wall with means for re-closably opening said cage top-wall, a first channel member made of flexible plastic material and embracing said frame and being fastened to the edges of said side-wall and said top-wall, a second channel member embracing the bottom edge of said side wall and said bottom wall and being fastened thereto, said top-wall having a flap to open and close said cage.

10. A cage as in cl.-aim 9, having a plurality of vertical flexible channel members open at one end for receiving a stiffener rod therein, whereby said cage side-wall can be folded to flatten the cage.

11. A cage as in claim 9, in which each of said channel members comprises a flexible plastic extrusion with staples driven through opposed side walls of said channel, and through the wall edge located within said channel.

12. A method of transporting an aquatic animal cage having a flexible netting side wall and setting up said cage to stand erect on the ground or bottom of a body of water, providing said cage with a plurality of spaced, flexible elongated receptacles on said side wall and stiffener members to fit into said receptacles, folding said side wall to flatten said cage, transporting said cage to a desired site, and inserting said stiffener members into said receptacles to erect said cage.

13. A method as in claim 12, including providing said cage with a bottom border against which the bottom of each of said receptacles abuts, said inserting step including bending said border away from said receptacles, and inserting one of said stiffeners into each of said receptacles.

* * * * *

UNITED STATES PATENT AND TRADEMARK OFFICE
CERTIFICATE OF CORRECTION

PATENT NO. : 5,009,189
DATED : April 23, 1991
INVENTOR(S) : Gregor N. Neff

It is certified that error appears in the above-identified patent and that said Letters Patent is hereby corrected as shown below:

In column 1, line 4, between the words "claim" and "in" insert —1—;

In column 2, line 15, replace "cl.aim" with —claim—.

Signed and Sealed this

First Day of September, 1992

*Attest:*

DOUGLAS B. COMER

*Attesting Officer*     *Acting Commissioner of Patents and Trademarks*